United States Patent
Liu et al.

(10) Patent No.: US 12,531,232 B2
(45) Date of Patent: Jan. 20, 2026

(54) THREE-DIMENSIONAL COMPOSITE METALLIC LITHIUM NEGATIVE ELECTRODE, METALLIC LITHIUM BATTERY AND APPARATUS

(71) Applicant: CONTEMPORARY AMPEREX TECHNOLOGY (HONG KONG) LIMITED, Hong Kong (CN)

(72) Inventors: Chengyong Liu, Ningde (CN); Yongsheng Guo, Ningde (CN); Chuying Ouyang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 700 days.

(21) Appl. No.: 17/583,084

(22) Filed: Jan. 24, 2022

(65) Prior Publication Data
US 2022/0149353 A1    May 12, 2022

Related U.S. Application Data

(63) Continuation of application No. PCT/CN2020/086260, filed on Apr. 23, 2020.

(51) Int. Cl.
| | |
|---|---|
| H01M 4/36 | (2006.01) |
| H01M 4/134 | (2010.01) |
| H01M 4/40 | (2006.01) |
| H01M 4/485 | (2010.01) |
| H01M 4/62 | (2006.01) |
| H01M 10/0525 | (2010.01) |
| H01M 4/02 | (2006.01) |

(52) U.S. Cl.
CPC .......... *H01M 4/364* (2013.01); *H01M 4/134* (2013.01); *H01M 4/405* (2013.01); *H01M 4/485* (2013.01); *H01M 4/622* (2013.01); *H01M 4/625* (2013.01); *H01M 10/0525* (2013.01); *H01M 2004/021* (2013.01); *H01M 2004/027* (2013.01)

(58) Field of Classification Search
CPC ...... H01M 4/134; H01M 4/364; H01M 4/405; H01M 4/485; H01M 4/622; H01M 4/625; H01M 10/0525
USPC ................................................ 429/212, 217
See application file for complete search history.

(56) References Cited

U.S. PATENT DOCUMENTS

2020/0313174 A1* 10/2020 Wang et al. ...... H01M 10/0562

FOREIGN PATENT DOCUMENTS

| CN | 102201565 A | 9/2011 | |
|---|---|---|---|
| CN | 206541886 U | 10/2017 | |
| CN | 109638284 A | * 4/2019 | ............ H01M 4/622 |
| CN | 109994739 A | 7/2019 | |
| CN | 110649267 A | 1/2020 | |
| CN | 110931712 A | 3/2020 | |
| JP | H0729602 A | 1/1995 | |
| WO | 2019019412 A1 | 1/2019 | |

OTHER PUBLICATIONS

Machine translation of CN 109638284 A (Year: 2019).*
Contemporary Amperex Technology Co., Limited, International Search Report, PCT/CN2020/086260, Jan. 28, 2021, 4 pgs.
Yangyang Liu et al., "Dendrite_free_lithium_metal_anode_enabled_by_separator_engineering_via_uniform_loading_of_lithiophilic_nucleation_sites", energy storage materials, May 2019, 8 pgs.
Qiang Zhao et al., "Expanded_graphite_embedded_in_lithium_metal_as_dendrite_free_anode_of_lithium_metal_batteries", Journal of Materials Chemistry A, Jul. 2, 2019, 9 pgs.
The extended European search report received in the corresponding European Application 20924978.8, mailed Apr. 20, 2022.
Decision to Grant a European Patent received in the corresponding European Application 20924978.8, mailed Jan. 19, 2023.
First Office Action received in the corresponding Chinese Application 202080005366.1, mailed Oct. 18, 2023.
Notification to Grant Patent Right received in the corresponding Chinese Application 202080005366.1, mailed Feb. 5, 2024.
Written Opinion of ISA received in the corresponding International Application PCT/CN2020/086260, mailed Jan. 28, 2021.

* cited by examiner

*Primary Examiner* — Kevin P Kerns
(74) *Attorney, Agent, or Firm* — K&L Gates LLP (57) ABSTRACT

A three-dimensional composite metallic lithium negative electrode, a metallic lithium battery, and an apparatus are disclosed. The composite metallic lithium negative electrode includes metallic lithium particles and a three-dimensional polymer framework, where the metallic lithium particles are filled in the three-dimensional polymer framework, and the three-dimensional polymer framework includes lithium-philic fragments, active sites, and polymer-containing moieties. The present application improves a volume effect of the metallic lithium negative electrode in charge and discharge process, which can inhibit side reactions of metallic lithium and electrolyte; increase a specific surface area of the metallic lithium negative electrode, and introduce lithium-philic nano-sites, thereby can guide a uniform deposition of the metallic lithium and effectively inhibit generation of lithium dendrites. In addition, the three-dimensional framework coated with active lithium can effectively reduce risks of brittle SEI film faced by traditional solutions.

17 Claims, 4 Drawing Sheets

THREE-DIMENSIONAL COMPOSITE METALLIC LITHIUM NEGATIVE ELECTRODE, METALLIC LITHIUM BATTERY AND APPARATUS

CROSS REFERENCE TO RELATED APPLICATIONS

The present application is a continuation of PCT application No. PCT/CN2020/086260, filed on Apr. 23, 2020, which is hereby incorporated by reference in its entirety.

TECHNICAL FIELD

The present application relates to the field of electrochemistry, and in particular to a three-dimensional composite metallic lithium negative electrode, a metallic lithium battery and an apparatus.

BACKGROUND

Nowadays, portable electronic equipment, electric vehicles, large-scale power grids, etc. have increasing requirements for battery energy density. However, most of the lithium ion batteries currently used use graphite as a negative electrode material, which has been close to its theoretical energy density limit after recent years of development, so it is difficult to further increase the battery energy density. As the negative electrode, since having a very high theoretical specific capacity (3860 mAh/g) and the lowest reduction potential (−3.04 V vs. standard hydrogen electrode), metallic lithium is considered to be the most potential negative electrode material for the next generation of lithium batteries.

However, the existing metallic lithium negative electrode and metallic lithium battery system mainly have following problems: 1) During a deposition-dissolution process of metallic lithium, when an apparent current density is large, a microscopic current density on the surface of the metallic lithium is distributed unevenly, which causes an uneven deposition of lithium, thus leading to a generation of lithium dendrites, and which further short-circuits the battery and causes safety problems; 2) The metallic lithium is chemically active and easily reacts with an electrolyte, thereby consuming the electrolyte; 3) During the deposition-dissolution process of lithium, a volume effect is serious.

Therefore, researchers propose following solutions to solve the above-mentioned problems. For example, 1) A SEI film is constructed on the surface of metallic lithium by decomposition with additives, solvents or suitable lithium salts. However, the SEI film constructed is generally brittle and easy to break in the process of volume change, thus exposing fresh lithium. At the same time, the SEI film is mostly composed of LiF, $Li_2CO_3$, LiOH, and $RCO_2$—Li, and a conductivity of lithium ions is very low; 2) a specific surface area of the negative electrode is increased by designing a three-dimensional current collector to reduce a micro current density, but this method usually needs to replenish metallic lithium to a three-dimensional current collector by melting, and does not consider a protection of metallic lithium, which leads to fast electrolyte consumption; 3) solid electrolyte is used, but an interface resistance between the solid electrolyte and the positive/negative electrodes is relatively high, and the conductivity of lithium ions is relatively poor, which may not achieve large current charging and discharging.

Therefore, there is an urgent need to develop a new metallic lithium negative electrode and metallic lithium battery.

SUMMARY

In view of the above-mentioned facts, some embodiments of the present application provide a three-dimensional composite metallic lithium negative electrode, a metallic lithium battery and an apparatus.

In a first aspect, some embodiments of the present application provide a three-dimensional composite metallic lithium negative electrode, including metallic lithium particles and a three-dimensional polymer framework, the metallic lithium particles are filled in the three-dimensional polymer framework, and the three-dimensional polymer framework includes lithium-philic fragments, active sites, and polymer-containing moieties.

In a second aspect, some embodiments of the present application provide a metallic lithium battery, including the three-dimensional composite metallic lithium negative electrode described in the first aspect of the present application.

In a third aspect, some embodiments of the present application provide an apparatus including the metallic lithium battery described in the second aspect of the present application.

Compared with existing technologies, technical solutions of the present application have at least following technical advantages: 1) improving the volume effect of the metallic lithium negative electrode in the charge/ discharge process; 2) inhibiting side reactions of the metallic lithium and the electrolyte; 3) increasing the specific surface area of the metallic lithium negative electrode and introducing lithium-philic nano-sites, which can reduce the overpotential of lithium deposition and the overpotential of lithium nucleation, guide a uniform deposition of metallic lithium, and effectively inhibit a growth of lithium dendrites; 4) effectively suppressing risks of brittle SEI film faced by traditional solutions as the three-dimensional framework is coated with active lithium.

BRIEF DESCRIPTION OF THE DRAWINGS

A three-dimensional composite metallic lithium negative electrode and a preparation method thereof as well as a metallic lithium battery and an apparatus of the present application can be described in detail below with reference to the drawings and specific examples.

DETAILED DESCRIPTION

A three-dimensional composite metallic lithium negative electrode and a metallic lithium battery and an apparatus of the present application are described in detail below.

For the sake of simplicity, only some numerical ranges are exemplarily disclosed herein. However, any lower limit may be combined with any other upper limit to form an unspecified range, any lower limit may be combined with other lower limits to form an unspecified range, and any upper limit may be combined with any other upper limit to form an unspecified range. In addition, although not explicitly stated, every point or single value between the end points of the range is included in the range. Therefore, each point or single numerical value may be used as its own lower limit or upper limit, combined with any other point or single numerical value, or combined with other lower limit or upper limit to form an unspecified range. It should be understood that the enumeration of numerical values is merely an example and should not be interpreted as exhaustive.

In the description herein, it should be noted that, unless otherwise stated, "above", "below", "≤", "≥" all include the number itself, and "at least one" means including one or more, and "more" in "one or more" means two or more.

Unless otherwise stated, all test materials/substances involved in the present application are commercially available.

Three-Dimensional Composite Metallic Lithium Negative Electrode

The first aspect of the present application relates to a three-dimensional composite metallic lithium negative electrode, including metallic lithium particles and a three-dimensional polymer framework, where the metallic lithium particles are filled in the three-dimensional polymer framework, and the three-dimensional polymer framework includes lithium-philic fragments, active sites and polymer-containing moieties.

In an example of the present application, each of the lithium-philic fragments is a fragment of a metal oxide with lithium-philic characteristics. Herein, the lithium-philic characteristic refers to be able to reduce the nucleation overpotential during the lithium deposition process, so that the nucleation overpotential of lithium ions in the three-dimensional composite metallic lithium negative electrode is lower than 10 mV.

The nucleation overpotential reflects the difficulty of converting lithium ions into metallic lithium when lithium ions undergo a lithium deposition process on the lithium negative electrode. The nucleation overpotential value is a difference between the highest overpotential during lithium deposition (lithium deposition overpotential) and the equilibrium overpotential. The smaller the value of the nucleation overpotential is, the easier it is to deposit lithium on the base material. In the present application, metal oxide with lithium-philic characteristics is added to a three-dimensional composite structure, so that the nucleation overpotential of lithium ions in the three-dimensional composite metallic lithium negative electrode is lower than 10 mV, which can effectively reduce the phenomenon of potential polarization during the lithium deposition process.

In an example of the present application, the metal oxide is selected from at least one of magnesium oxide, zinc oxide, copper oxide, lead oxide, bismuth oxide, tin oxide and silver oxide. In a specific example of the present application, the metal oxide is selected from magnesium oxide, copper oxide, zinc oxide, or bismuth oxide. In a preferred example of the present application, the metal oxide is selected from magnesium oxide.

In an example of the present application, a weight ratio of the lithium-philic fragments relative to the three-dimensional composite metallic lithium negative electrode is 0.5%~5%. In a preferred example of the present application, the weight ratio of the lithium-philic fragments relative to the three-dimensional composite metallic lithium negative electrode is 1%~3%.

In an example of the present application, each of the active site refers to an active group capable of undergoing lithiation reaction contained in the three-dimensional polymer framework, and the active group is selected from at least one of sulfur-containing groups, nitrogen-containing groups. In a specific example of the present application, the active group is selected from groups including at least one —S— or —N—. In a specific example of the present application, the active group is selected from at least one of —S—, —S—S—, —S—S—S—, and —S—(S)n—S—, here n is a positive integer.

In an example of the present application, the polymer is selected from one of polyacrylonitrile (PAN), vulcanized polyacrylonitrile (SPAN), polyaniline (PANI), vulcanized polyaniline (SPANI), polypyrrole (PPY) and vulcanized polypyrrole (SPPY). In a specific example of the present application, the polymer is selected from one of polyacrylonitrile (PAN), polyaniline (PANI), and polypyrrole (PPY). In a preferred example of the present application, the polymer is selected from polyacrylonitrile (PAN).

In an example of the present application, a molar ratio of the lithium-philic fragments to the active sites in the three-dimensional polymer framework is 1:5~1:60. In a preferred example of the present application, the molar ratio of the lithium-philic fragments to the active sites in the three-dimensional polymer backbone is 1:5~1:10, including any value, all ranges and any subranges therein, for example, including but not limited to 1:5, 1:6, 1:7, 1:8, 1:9, 1:10, etc.

In an example of the present application, the metal oxide is in the form of particles, and the volume average particle diameter (D$_v$50-1) of the particles is 50 nm~500 nm, including any value, all ranges and any sub-ranges therein, for example, including but are not limited to, 50 nm, 100 nm, 150 nm, 200 nm, 500 nm, and 50 nm~100 nm, 50 nm~150 nm, 50 nm~200 nm, 100 nm~200 nm, 200 nm~500 nm, etc. The volume average particle size D$_v$50 of the metal oxide particles has a well-known meaning in the art, and may be measured with a well-known instrument and method in the existing technology. For example, referring to the GB/T 19077-2016 particle size distribution laser diffraction method, it may be measured with a laser particle size analyzer conveniently, such as the Mastersizer 2000E laser particle size analyzer of Malvern Instruments Ltd., UK. Similarly, the above method may be used to test the volume average particle size of the metallic lithium particles.

In an example of the present application, the volume average particle diameter ($D_v50$-2) of the metallic lithium particles is 1 μm-100 μm, including any value, all ranges and any subranges therein, for example, including but are not limited to, 1 μm, 5 μm, 10 μm, 20 μm, 30 μm, 40 μm, 50 μm, 60 μm, 70 μm, 80 μm, 90 μm, 100 μm, and 1μm~10 μm, 1 μm~50 μm, 10 μm~50 μm, 10 μm~80 μm, 10 μm~100 μm etc.

In an example of the present application, a weight ratio of the metallic lithium particles relative to the three-dimensional composite metallic lithium negative electrode is 50%~85%. In another example of the present application, the weight ratio of the metallic lithium particles to the three-dimensional composite metallic lithium negative electrode is 50%~75%, including any value, all ranges and any sub-ranges therein, for example, including but not limited to, 50%, 55%, 60%, 65%, 66%, 67%, 68%, 69%, 70%, 71%, 72%, 73%, 74%, 75%, etc., and 50%~70%, 60%~70%, 65%~75%, etc.

In an example of the present application, a mass ratio of the lithium-philic fragments to the metallic lithium particles is 1:10~1:150, preferably 1:20~1:30, including any value, all ranges and any subranges therein, for example, including but not limited to, 1:20, 1:25, 1:30, etc.

In an example of the present application, the lithium-philic fragments, the active sites, and the metallic lithium particles are uniformly distributed in the three-dimensional composite metallic lithium negative electrode. In a preferred example of the present application, the difference in element distribution concentration of the lithium-philic fragments, the active sites, and the metallic lithium particles per square millimeter in a thickness direction of the three-dimensional composite metallic lithium negative electrode is not more than 5%. In the present application, when the difference in the element distribution concentration of the lithium-philic fragments, the active sites, and the metallic lithium particles per square millimeter in the thickness direction of the three-dimensional composite metallic lithium negative electrode is not more than 5%, the uniformity of lithium deposition can be effectively induced. Specifically, the method for testing the element distribution concentration of the above-mentioned substances per square millimeter in the thickness direction of the three-dimensional composite metallic lithium negative electrode is: using an environmental scanning electron microscope (SEM, Quanta 200 FEI, FEI Company in the Netherlands) to test the distribution of elements in the plate section.

In an example of the present application, the three-dimensional composite metallic lithium negative electrode further includes a conductive material selected from one or more of carbon nanotubes, conductive carbon black, and graphene.

In an example of the present application, the conductive material includes at least one or more of carbon nanotubes, conductive carbon black, and/or graphene. Herein, an inner diameter of the carbon nanotube is 1 nm~10 nm, and a length of the carbon nanotube is about 5 μm~20 μm.

In an example of the present application, based on a total weight of the three-dimensional composite metallic lithium negative electrode, a content of the conductive material is 5 wt %~30 wt %.

In an example of the present application, a pore diameter in the three-dimensional composite metallic lithium negative electrode is 10 μm~800 μm, including any numerical value, all ranges and any sub-ranges therein, for example, including but not limited to, 10 μm, 30 μm, 50 μm, 100 μm, 200 μm, 300 μm, 500 μm, 800 μm, and 10 μm~50 μm, 10 μm~100 μm, 10 μm~200 μm, 10 μm~500 μm, 30 μm~50 μm, 30 μm~100 μm, 30 μm~200 μm, 30 μm~500 μm, etc.

The three-dimensional composite metallic lithium negative electrode described in the first aspect of the present application may be prepared by the following method:

S1): a metal oxide, sulfur-containing or nitrogen-containing substance, and a polymer in a metered ratio are mixed by ball-milling, and then calcined in an anhydrous and oxygen-free environment to obtain a three-dimensional polymer framework, which is crushed and sieved;

S2): In the anhydrous and oxygen-free environment, the three-dimensional polymer framework obtained in S1) is mixed with the metallic lithium particles in a metered ratio and ground uniformly;

S3): In the anhydrous and oxygen-free environment, a conductive material is added to the lithium-containing three-dimensional polymer framework obtained in S2), and mixed them uniformly, and then a resulting product is pressed into a sheet-shaped electrode in a tablet mold;

S4): In the anhydrous and oxygen-free environment, a pressed sheet-shaped electrode is heat-treated to obtain a three-dimensional composite metallic lithium negative electrode of the present application.

In an example of the present application, the sulfur-containing or nitrogen-containing substance is selected from elemental sulfur, sulfur-containing or nitrogen-containing substance. For example, the sulfur-containing or nitrogen-containing substance may be selected from one or more of polyacrylonitrile (PAN), sulfurized polyacrylonitrile (SPAN), polyaniline (PANI), sulfurized polyaniline (SPANI), polypyrrole (PPY), and sulfurized polypyrrole (SPPY).

In an example of the present application, the metered ratio of the metal oxide, the sulfur-containing substance or nitrogen-containing substance, and the polymer is 2~20:71~87:9:11. For example, in an example of the present application, the metered ratio of the metal oxide, the sulfur-containing substance or nitrogen-containing substance, and the polymer is 10:80:10.

In an example of the present application, the metal oxide, the sulfur-containing or nitrogen-containing substance, and the polymer are mixed and ball milled for 2 h~20 h, including any value, all ranges and any sub-ranges therein, for example, including but not limited to, 2 h, 3 h, 4 h, 5 h, 6 h, 7 h, 8 h, 10 h, 15 h, 20 h, and 2 h~10 h, 2 h~8 h, 2 h~6 h, 2 h~4 h, 3 h~20 h, 3 h~15 h, 3 h~10 h, 3 h~6 h, 5 h~20 h, 5 h~10 h, etc.

In an example of the present application, the metal oxide, the sulfur-containing or nitrogen-containing substance, and the polymer are mixed and ball-milled, and then calcined in the anhydrous and oxygen-free environment at 100° C.~500° C. for 5 h~20 h, for example, including but are not limited to, at 100° C., 150° C., 200° C., 250° C., 300° C., 350° C., 400° C., 450° C., or 500° C. (and any range of their combination, for example, including but not limited to, 100° C.~300° C., 150° C.~300° C., etc.) for 5 h, 6 h, 7 h, 8 h, 9 h, 10 h, 15 h or 20 h (and any range of their combination, for example, including but not limited to, 5 h~15 h, 5 h~10 h, 6 h~20 h, 6 h~15 h, 6 h~10 h, etc.).

In an example of the present application, the three-dimensional polymer framework obtained after calcination is crushed and sieved to obtain particles with a particle size of 50 nm~500 nm, for example, including but are not limited to, 50 nm, 100 nm, 200 nm, 250 nm, 300 nm, 350 nm, 400 nm, 450 nm, or 500 nm (and any range of their combination, for example, including but not limited to, 50 nm~100 nm, 100 nm~200 nm, 150 nm~500 nm, etc.).

In an example of the present application, a mass ratio of the three-dimensional polymer framework to the metallic lithium particles is 1:10, including any value, all ranges and any subranges therein, for example, including but are not limited to, 1:1, 1:2, 1:3, 1:4, 1:5, etc.

In an example of the present application, based on the total weight of the three-dimensional composite metallic lithium negative electrode, an addition amount of the conductive material is 5 wt %~30 wt %, including any value, all ranges and any subranges therein, for example, including but not limited to, 5 wt %, 6 wt %, 7 wt %, 8 wt %, 9 wt %, 10 wt %, 15 wt %, 20 wt %, 25 wt %, 30 wt %, and 5 wt %~10 wt %, 5 wt %~15 wt %, 5 wt %~20 wt %, 10 wt %~15 wt %, 10 wt %~20 wt %, 10 wt %~30 wt %, etc.

In an example of the present application, tableting is performed at 1 MPa~10 MPa, including any value, all ranges and any sub-ranges therein, for example, including but not limited to, 1 MPa, 2 MPa, 3 MPa, 4 MPa, 5 MPa, 6 MPa, 7 MPa, 8 MPa, 9 MPa, 10 MPa, and 1 MPa~8 MPa, 1 MPa~5 MPa, 3 MPa~10 MPa, 3 MPa~5 MPa, etc.

In an example of the present application, the pressed sheet-shaped electrode is heat-treated at a temperature of 100° C.~300° C. for about 0.1 h~2 h, for example, including but not limited to, at 100° C., 150° C., 200° C., 250° C., or 300° C. (and any range of their combination, for example, including but not limited to, 100° C.~200° C., 100° C.~150° C., 150° C.~200° C., etc.) for about 0.1 h, 0.2 h, 0.3 h, 0.4 h, 0.5 h, 0.6 h, 0.7 h, 0.8 h, 0.9 h, 1.0 h, 1.5 h or 2.0 h (and any range of their combination, for example, including but not limited to 0.1 h~1 h, 0.1 h~0.5 h, 0.5 h~2 h, 0.5 h~1 h, etc.).

Metallic Lithium Battery

The second aspect of the present application relates to a metallic lithium battery, including the three-dimensional metallic lithium negative electrode according to the first aspect of the present application.

In an example of the present application, the metallic lithium battery may be the above-mentioned three-dimensional composite metallic lithium negative electrode/metallic lithium sheet half-cell, a lithium-containing negative electrode/lithium-containing negative electrode symmetric battery, and a full battery.

In an example of the present application, the metallic lithium battery may be a can type lithium battery, a pouch type battery, or a button battery. In a specific example of the present application, the metallic lithium battery is a CR2030 button battery.

Apparatus

The third aspect of the present application relates to an apparatus, including the metallic lithium battery of the second aspect of the present application. The metallic lithium battery may be used as the power source of the apparatus, and may also be used as the energy storage unit of the apparatus. The apparatus includes, but is not limited to, the power supply for the real-time clock in the computer motherboard, the power supply for the camera's perpetual calendar chip, the infrared remote control power supply for remote photography, electronic dictionaries, calculators, small electronic toys, hand-cranked flashlights, Bluetooth headsets, MP3 players, electronic calendar clocks, barcode readers, tax controllers, hearing aids, watches, weight scales, etc.

Those skilled in the art can understand that the various limitations or preferred ranges of the three-dimensional composite metallic lithium negative electrode, metallic lithium battery and apparatus in different examples of the present application mentioned above may be combined arbitrarily, and those examples obtained resulting from the combinations are still within the scope of the present application and are regarded as part of the disclosure of this specification.

Unless otherwise specified, various parameters involved in this specification have general meanings known in the existing technology, and may be measured according to methods known in the existing technology. For example, the test may be performed according to the method given in the example of the present application. In addition, the preferred ranges and options of various different parameters given in various preferred examples may be combined arbitrarily, and various combinations obtained therefrom are deemed to be within the scope of the disclosure of the present application.

The advantages of the present application are further described below in conjunction with specific examples. It should be understood that these examples are only used to illustrate the present application and not to limit the scope of the present application.

EXAMPLES

The present application will be further elaborated below in conjunction with specific examples. It should be understood that the following exemplary examples are only used for illustration and do not limit the present application. Unless otherwise stated, all reagents used in the examples are commercially available or synthesized according to conventional methods, and may be used directly without further processing. The experimental conditions not specified in the examples adopt conventional conditions, or adopt conditions recommended by material suppliers or equipment suppliers.

Example 1

1. Preparation of Three-Dimensional Composite Metallic Lithium Negative Electrode Using magnesium oxide (MgO) nanoparticles, sulfur (S) powder, polyacrylonitrile (PAN) powder, metallic lithium particles and carbon nanotubes as raw materials, the preparation is carried out according to the following steps:

S1) S, PAN, and MgO nanoparticles are mixed and ball milled at a mass ratio of 80:10:10 for 6 h, and then calcined at 300° C. for 6 h in an anhydrous and oxygen-free environment to obtain a MgO-SPAN powder, which is crushed and sieved.

S2): In the anhydrous and oxygen-free environment, the MgO-SPAN powder (particle size 100 nm~200 nm) and metallic lithium particles (particle size 10 μm~50 μm) are mixed at a mass ratio of 1:3 and ground uniformly.

S3): In the anhydrous and oxygen-free environment, after 10 wt % (calculated based on the weight of all raw materials added) of carbon nanotube with a length of 15 μm and an inner diameter of 1 nm~10 nm is added to the mixture obtained in step S2) and mixed uniformly, a resulting product is flattened in a tablet mold and pressed into a sheet-shaped electrode with a diameter of 11 mm under a pressure of 3 MPa.

S4) In the anhydrous and oxygen-free environment, a pressed sheet-shaped electrode is heated at 150° C. for 0.5 hours to obtain a three-dimensional composite metallic lithium negative electrode (hereinafter composite negative electrode, composite negative electrode plate, or Li/MgO-SPAN composite negative electrode, they are used interchangeably herein) of the present application.

2. Preparation of Three-Dimensional Composite Metallic Lithium/Metallic Lithium Sheet Half-Cell Using a polypropylene film (Φ16 mm) with a thickness of 12 μm as a separator, then a metallic lithium sheet, the separator, and the three-dimensional composite metallic lithium negative electrode plate prepared above are placed in order, so that the separator is located between the metallic lithium sheet and the composite negative electrode plate to play a role of isolation. After injecting an electrolyte with a concentration of 1 mol/L obtained by making $LiPF_6$ dissolved in a mixed solvent of ethylene carbonate (EC), dimethyl carbonate (DMC), and fluoroethylene carbonate (FEC) with a volume ratio of 45:45:10, a CR2030 button battery is assembled. After standing for 24 h, a three-dimensional composite lithium half-cell is obtained.

3. Preparation of Lithium-Containing Negative Electrode/Lithium-Containing Negative Electrode Symmetric Battery Using a polypropylene film (Φ16 mm) with a thickness of 12 μm as a separator, then the three-dimensional composite metallic lithium negative electrode plate prepared above, the separator, and the three-dimensional composite metallic lithium negative electrode plate prepared above are placed in order, so that the separator is located between the two negative electrode plates to play the role of isolation. After injecting an electrolyte with a concentration of 1 mol/L obtained by making $LiPF_6$ dissolved in a mixed solvent of ethylene carbonate (EC), dimethyl carbonate (DMC), and fluoroethylene carbonate (FEC) with a volume ratio of 45:45:10, a CR2030 button battery is assembled. After standing for 24 h, a lithium-containing negative electrode/lithium-containing negative electrode symmetric battery is obtained.

4. Preparation of Full Battery

1) Preparation of vulcanized polyacrylonitrile positive electrode plate: After vulcanized polyacrylonitrile, polyacrylic acid, and graphene are mixed in a mass ratio of 80:10:10, a resulting product is directly coated on 15 μm aluminum foil with a scraper. The aluminum foil coated is dried for 4 hours at 85° C. under vacuum conditions, and then cut into discs with a diameter of Φ10 mm to obtain a vulcanized polyacrylonitrile positive electrode plate with a sulfur loading of 1 mg/cm$^2$ (composite loading of 2.5 mg) coated on one side.

2) Preparation of electrolyte: In a drying room, ethylene carbonate (EC), dimethyl carbonate (DMC), and fluoroethylene carbonate (FEC) are mixed in a volume ratio of 45:45:10 to obtain an organic mixed solvent. $LiPF_6$ is added to the organic mixed solvent to obtain an electrolyte with a $LiPF_6$ concentration of 1 mol/L.

3) Preparation of full battery: Using a polypropylene film (Φ16 mm) with a thickness of 12 μm as a separator, then the vulcanized polyacrylonitrile positive electrode plate prepared above, the separator, and the three-dimensional composite metallic lithium negative electrode plate prepared above are placed in order so that the separator is located between the positive electrode plate and the negative electrode plate to play the role of isolation. After the electrolyte is injected, a CR2030 button battery is assembled. After standing for 24 h, a lithium-sulfur secondary battery (namely full battery, also called lithium battery) is obtained.

Example 2

The preparation process of the three-dimensional composite metallic lithium negative electrode, lithium-containing negative electrode/lithium-containing negative electrode symmetric battery, and lithium battery in this example is the same as that of Example 1, except that the heat treatment temperature of the three-dimensional composite metallic lithium negative electrode is 100° C.

Example 3

The preparation process of the three-dimensional composite metallic lithium negative electrode, lithium-containing negative electrode/lithium-containing negative electrode symmetric battery, and lithium battery in this example is the same as that of Example 1, except that the heat treatment temperature of the three-dimensional composite metallic lithium negative electrode is 200° C.

Example 4

The preparation process of the three-dimensional composite metallic lithium negative electrode, lithium-containing negative electrode/lithium-containing negative electrode symmetric battery, and lithium battery in this example is the same as that of Example 1, except that the usage amount of MgO is reduced from 10 g to 2 g.

Example 5

The preparation process of the three-dimensional composite metallic lithium negative electrode, lithium-containing negative electrode/lithium-containing negative electrode symmetric battery, and lithium battery in this example is the same as that of Example 1, except that the usage amount of MgO is reduced from 10 g to 5 g.

Example 6

The preparation process of the three-dimensional composite metallic lithium negative electrode, lithium-containing negative electrode/lithium-containing negative electrode symmetric battery, and lithium battery in this example is the same as that of Example 1, except that the usage amount of MgO is increased from 10 g to 15 g.

Example 7

The preparation process of the three-dimensional composite metallic lithium negative electrode, lithium-containing negative electrode/lithium-containing negative electrode symmetric battery, and lithium battery in this example is the same as that of Example 1, except that the usage amount of MgO is increased from 10 g to 20 g.

Example 8

The preparation process of the three-dimensional composite metallic lithium negative electrode, lithium-containing negative electrode/lithium-containing negative electrode symmetric battery, and lithium battery in this example is the same as that of Example 1, except that MgO is replaced with CuO.

Example 9

The preparation process of the three-dimensional composite metallic lithium negative electrode, lithium-containing negative electrode/lithium-containing negative electrode symmetric battery, and lithium battery in this example is the same as that in Example 1, except that MgO is replaced with ZnO.

Example 10

The preparation process of the three-dimensional composite metallic lithium negative electrode, lithium-containing negative electrode/lithium-containing negative electrode symmetric battery, and lithium battery in this example is the same as that of Example 1, except that MgO is replaced with $Bi_2O_3$.

Example 11

The preparation process of the three-dimensional composite metallic lithium negative electrode, lithium-containing negative electrode/lithium-containing negative electrode symmetric battery, and lithium battery in this example is the same as that of Example 1, except that SPAN is replaced with SPPY.

Example 12

The preparation process of the three-dimensional composite metallic lithium negative electrode, lithium-containing negative electrode/lithium-containing negative electrode symmetric battery, and lithium battery in this example is the same as that of Example 1, except that SPAN is replaced with SPANI.

Example 13

The preparation process of the three-dimensional composite metallic lithium negative electrode, lithium-containing negative electrode/lithium-containing negative electrode symmetric battery, and lithium battery in this example is the same as that of Example 1, except that the particle size distribution of the MgO-SPAN powder is 50 nm~100 nm.

Example 14

The preparation process of the three-dimensional composite metallic lithium negative electrode, lithium-containing negative electrode/lithium-containing negative electrode symmetric battery, and lithium battery in this example is the same as that of Example 1, except that the particle size distribution of the MgO-SPAN powder is 200 nm~500 nm.

Example 15

The preparation process of the three-dimensional composite metallic lithium negative electrode, lithium-containing negative electrode/lithium-containing negative electrode symmetric battery, and lithium battery in this example is the same as that of Example 1, except that the mass ratio of MgO-SPAN powder to metallic lithium powder is 1:1.

Example 16

The preparation process of the three-dimensional composite metallic lithium negative electrode, lithium-containing negative electrode/lithium-containing negative electrode symmetric battery, and lithium battery in this example is the same as that of Example 1 except that the mass ratio of MgO-SPAN powder to metallic lithium particles is 1:2.

Example 17

The preparation process of the three-dimensional composite metallic lithium negative electrode, lithium-containing negative electrode/lithium-containing negative electrode symmetric battery, and lithium battery of this example is the same as that of Example 1, except that the mass ratio of MgO-SPAN powder to metallic lithium particles is 1:5.

Example 18

The preparation process of the three-dimensional composite metallic lithium negative electrode, lithium-containing negative electrode/lithium-containing negative electrode symmetric battery, and lithium battery in this example is the same as that of Example 1, except that the particle size of the metallic lithium particles is 1 μm~10 μm.

Example 19

The preparation process of the three-dimensional composite metallic lithium negative electrode, lithium-containing negative electrode/lithium-containing negative electrode symmetric battery, and lithium battery in this example is the same as that of Example 1, except that the particle size of the metallic lithium particles is 50 μm~100 μm.

Comparative Example 1

The preparation process of the lithium battery and the lithium-containing negative electrode/lithium-containing negative electrode symmetric battery of this example is the same as that of Example 1, except that the negative electrode is an untreated metallic lithium sheet.

Comparative Example 2

The preparation process of the negative electrode, lithium battery, and lithium-containing negative electrode/lithium-containing negative electrode symmetric battery of this example is the same as that of Example 1, except that in this example, MgO nanoparticles are not added to the raw material of the negative electrode, but SPAN powder, metallic lithium particles and carbon nanotubes are directly used as the raw materials and are heat treated at 150° C. to prepare the negative electrode.

Comparative Example 3

The preparation process of the negative electrode, lithium battery, and lithium-containing negative electrode/lithium-containing negative electrode symmetric battery of this example is the same as that of Example 1 except that the raw materials of the negative electrode in this example are MgO nanoparticles, SPAN powder, metallic lithium particles and carbon nanotubes, which are directly ground and mixed and then pressed to prepare the plate. Specific steps are as follows: MgO nanoparticles and SPAN powder are rolled once by a metal rolling method to form a mixture; carbon nanotube is spread on the surface of the mixture, and then the carbon nanotubes is filled into the structure of the mixture by rolling to obtain a network structure filled with carbon; the metallic lithium particles are spread on the surface of the network structure that contains carbon, and then rolled, so that the metallic lithium is filled into the network structure, and the rolling is repeated 3~20 times to obtain a negative electrode.

Comparative Example 4

The preparation process of the three-dimensional composite metallic lithium negative electrode, lithium-containing negative electrode/lithium-containing negative electrode symmetric battery, and lithium battery in this example is the same as that of Example 1, except that the three-dimensional composite metallic lithium negative electrode is prepared with the silica nanoparticles having the same particle size to replace the magnesium oxide nanoparticles.

The specific parameters of Examples 1-19 and Comparative Examples 1-4 are listed in Table 1.

TABLE 1

Specific Parameters of Examples 1-19 and Comparative Examples 1-4

| | Three-dimensional polymer framework | | | | Metallic lithium particle | | | | | | |
|---|---|---|---|---|---|---|---|---|---|---|---|
| | Lithium-philic fragments | | | | | | | | | | |
| | Metal Oxide | Particle Size (nm) | Polymer | N1* | Form | Particle Size (μm) | N2* | N3* | Conductive material Substance | N4* | Heat treatment condition | Distribution Uniformity |
| Example 1 | Magnesium Oxide | 100-200 | SPAN | 1/10 | Particle | 10-50 | 1/30 | 1:3 | CNT | 10 | 150° C./0.5 h | 90% |
| Example 2 | Magnesium oxide | 100-200 | SPAN | 1/10 | Particle | 10-50 | 1/30 | 1:3 | CNT | 10 | 100° C./0.5 h | 83% |
| Example 3 | Magnesium Oxide | 100-200 | SPAN | 1/10 | Particle | 10-50 | 1/30 | 1:3 | CNT | 10 | 200° C./0.5 h | 98% |
| Example 4 | Magnesium Oxide | 100-200 | SPAN | 1/60 | Particle | 10-50 | 1/150 | 1:3 | CNT | 10 | 150° C./0.5 h | 90% |
| Example 5 | Magnesium Oxide | 100-200 | SPAN | 1/20 | Particle | 10-50 | 1/60 | 1:3 | CNT | 10 | 150° C./0.5 h | 90% |
| Example 6 | Magnesium Oxide | 100-200 | SPAN | 1/6 | Particle | 10-50 | 1/20 | 1:3 | CNT | 10 | 150° C./0.5 h | 90% |
| Example 7 | Magnesium Oxide | 100-200 | SPAN | 1/5 | Particle | 10-50 | 1/15 | 1:3 | CNT | 10 | 150° C./0.5 h | 90% |
| Example 8 | Copper oxide | 100-200 | SPAN | 1/20 | Particle | 10-50 | 1/30 | 1:3 | CNT | 10 | 150° C./0.5 h | 90% |
| Example 9 | Zinc oxide | 100-200 | SPAN | 1/20 | Particle | 10-50 | 1/30 | 1:3 | CNT | 10 | 150° C./0.5 h | 90% |
| Example 10 | Bismuth oxide | 100-200 | SPAN | 1/60 | Particle | 10-50 | 1/30 | 1:3 | CNT | 10 | 150° C./0.5 h | 90% |
| Example 11 | Magnesium oxide | 100-200 | SPPY | 1/10 | Particle | 10-50 | 1/30 | 1:3 | CNT | 10 | 150° C./0.5 h | 90% |
| Example 12 | Magnesium oxide | 100-200 | SPANI | 1/10 | Particle | 10-50 | 1/30 | 1:3 | CNT | 10 | 150° C./0.5 h | 90% |
| Example 13 | Magnesium oxide | 50-100 | SPAN | 1/10 | Particle | 10-50 | 1/30 | 1:3 | CNT | 10 | 150° C./0.5 h | 90% |
| Example 14 | Magnesium oxide | 200-500 | SPAN | 1/10 | Particle | 10-50 | 1/30 | 1:3 | CNT | 10 | 150° C./0.5 h | 90% |
| Example 15 | Magnesium oxide | 100-200 | SPAN | 1/10 | Particle | 10-50 | 1/10 | 1:1 | CNT | 10 | 150° C./0.5 h | 90% |
| Example 16 | Magnesium oxide | 100-200 | SPAN | 1/10 | Particle | 10-50 | 1/20 | 1:2 | CNT | 10 | 150° C./0.5 h | 90% |
| Example 17 | Magnesium oxide | 100-200 | SPAN | 1/10 | Particle | 10-50 | 1/50 | 1:5 | CNT | 10 | 150° C./0.5 h | 90% |
| Example 18 | Magnesium oxide | 100-200 | SPAN | 1/10 | Particle | 1-10 | 1/30 | 1:3 | CNT | 10 | 150° C./0.5 h | 98% |
| Example 19 | Magnesium oxide | 100-200 | SPAN | 1/10 | Particle | 50-100 | 1/30 | 1:3 | CNT | 10 | 150° C./0.5 h | 85% |
| Comparative Example 1 | / | / | / | / | Thin Film | / | / | / | / | / | / | / |
| Comparative Example 2 | / | / | SPAN | / | Particle | / | / | 1:3 | CNT | 10 | 150° C./0.5 h | 74% |

TABLE 1-continued

Specific Parameters of Examples 1-19 and Comparative Examples 1-4

| | Three-dimensional polymer framework | | | | Metallic lithium particle | | | | Conductive material | | Heat treatment condition | Distribution Uniformity |
| --- | --- | --- | --- | --- | --- | --- | --- | --- | --- | --- | --- | --- |
| | Lithium-philic fragments | | | | | | | | | | | |
| | Metal Oxide | Particle Size (nm) | Polymer | N1* | Form | Particle Size (μm) | N2* | N3* | Substance | N4* | | |
| Comparative Example 3 | Magnesium oxide | 100-200 | SPAN | 1/10 | Particle | 15 | 1/30 | 1:3 | CNT | 10 | / | 50% |
| Comparative Example 4 | silicon oxide | 100-200 | SPAN | 1/10 | Particle | 10-50 | 1/30 | 1:3 | CNT | 10 | 150° C./0.5 h | 90% |

Notes:
N1*: Molar ratio of lithium-philic fragments to active sites;
N2*: Mass ratio of lithium-philic fragments to metallic lithium particle;
N3*: Mass ratio of three-dimensional polymer framework to metallic lithium particle;
N4*: The proportion relative to the total weight of the negative electrode (wt %).

Performance Test

1) SEM test: An environmental scanning electron microscope (SEM, Quanta200 FEI, FEI Company in the Netherlands) is used to test the morphology of the material and the plate.

2) XRD test: Japanese Rigaku D-MAX2500VB X-ray diffraction is used to test the structure change of the material with a scanning speed of 8°/min, and a diffraction angle range of 10°-80°.

3) Mass specific capacity test: The lithium-containing negative electrode prepared in each of examples and comparative examples is assembled with a metallic lithium sheet to form a lithium-containing negative electrode/a metallic lithium sheet half-cell, respectively. The half-cell is discharged to 1.0V at a constant current of 1.0 mA/cm$^2$, and the mass specific capacity value of the lithium-containing negative electrode prepared in each of examples and comparative examples is recorded.

4) Lithium deposition overpotential test: The lithium-containing negative electrode prepared in each of examples and comparative examples is assembled with a metallic lithium sheet to form a lithium-containing negative electrode/a metallic lithium sheet half-cell, respectively. The half-cell is charged at a constant current of 1.0 mA/cm$^2$ until the surface capacity of the newly deposited lithium on the lithium-containing negative electrode reaches 1 mAh/cm$^2$, and the potential change in the half-cell of each of examples and comparative examples is recorded. Among them, the lithium deposition nucleation overpotential is the difference between the maximum value of the lithium deposition overpotential and the equilibrium potential.

5) Cycle stability test: The lithium-containing negative electrode prepared in each of examples and comparative examples is assembled into a lithium-containing negative electrode/lithium-containing negative electrode symmetric battery, respectively. Charging and discharging is repeated under 1 mA/cm$^2$ current density with 1 mAh/cm$^2$ surface capacity deposition/dissolution conditions respectively, to observe the voltage change of lithium-containing negative electrode/lithium-containing negative electrode symmetric battery.

6) First cycle charging specific capacity and capacity retention rate test of full battery: The lithium-containing negative electrode prepared in each of examples and comparative examples is assembled into a full battery of lithium-containing negative electrode/sulfurized polyacrylonitrile positive electrode, respectively. The full battery is discharged with a constant current of 1 C (1.4 mA/cm$^2$) to 1.0V, and then charged to 3.0V with a constant current of 1 C (1.4 mA/cm$^2$) to obtain the specific charge capacity ($C_{c1}$) in the first cycle; charging and discharging in this way is repeated to the nth week, the specific charge capacity after n cycles of the full battery is recorded as $C_{cn}$. The first cycle efficiency (%) and capacity retention rate (%) are calculated according to the following formulas.

First cycle efficiency (%)=first cycle charge specific capacity ($C_{c1}$)/first cycle discharge specific capacity ($C_{d1}$)

Capacity retention rate (%)=charging specific capacity ($C_{cn}$) after n weeks of cycle/first cycle charging specific capacity ($C_{c1}$).

7) Surface observation of the metallic lithium negative electrode plate: The metallic lithium battery after the 200-week cycle is disassembled, and a surface morphology of the metallic lithium negative electrode plate is observed through an optical microscope to observe whether lithium dendrites are formed.

Figure 1:
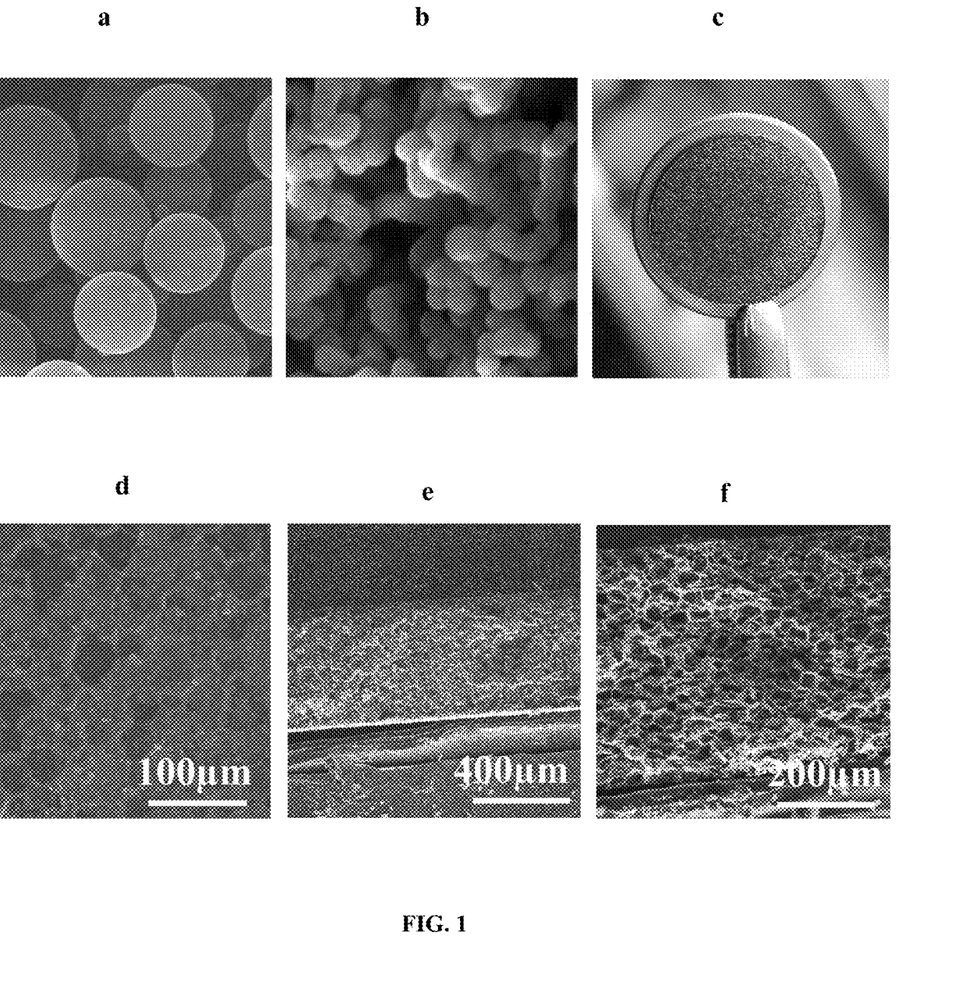
FIG. 1 is a SEM image and photograph of the three-dimensional composite metallic lithium negative electrode plate, metallic Li particles, and MgO-SPAN powder according to Example 1 of the present application, herein FIG. a is metallic Li particles, FIG. b is MgO-SPAN powder, and FIG. c is a photograph of the negative electrode plate, FIG. d is a SEM image of a surface of the negative plate, FIG. e is a SEM image of a cross section of the negative electrode plate, and FIG. f is a cross-sectional SEM image of the negative plate after being completely delithiated.

FIG. 1 shows SEM images and photographs of the three-dimensional composite metallic lithium negative electrode plate, metallic Li particles, and MgO-SPAN powder made according to Example 1 of the present application, and it may be observed clearly that the obtained three-dimensional composite metallic lithium negative electrode has an obvious three-dimensional structure.

Figure 2:
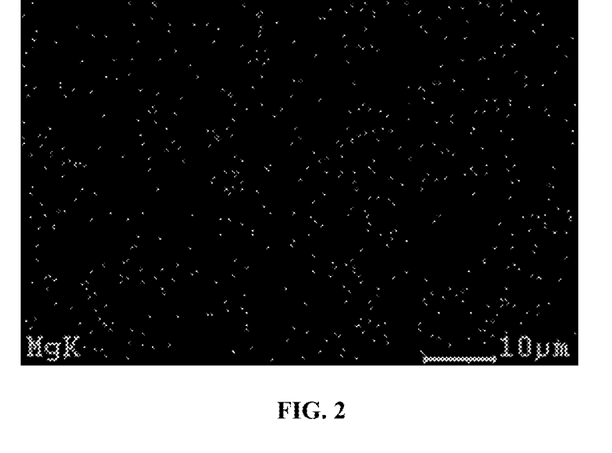
FIG. 2 is a plate cross-sectional SEM image of dispersibility of the MgO lithium-philic fragments in the three-dimensional composite metallic lithium negative electrode plate prepared in the Example 1 of the present application.

FIG. 2 shows a plate cross-sectional SEM image of dispersibility of the MgO lithium-philic fragment in the three-dimensional composite metallic lithium negative plate made according to Example 1 of the present application (wherein K represents the K line under X-ray test). It can be clearly observed that the Mg element in the three-dimensional composite metallic lithium negative electrode prepared is uniformly dispersed, indicating that the preparation process of the composite negative electrode of the present application can make the components uniformly dispersed.

Figure 3:
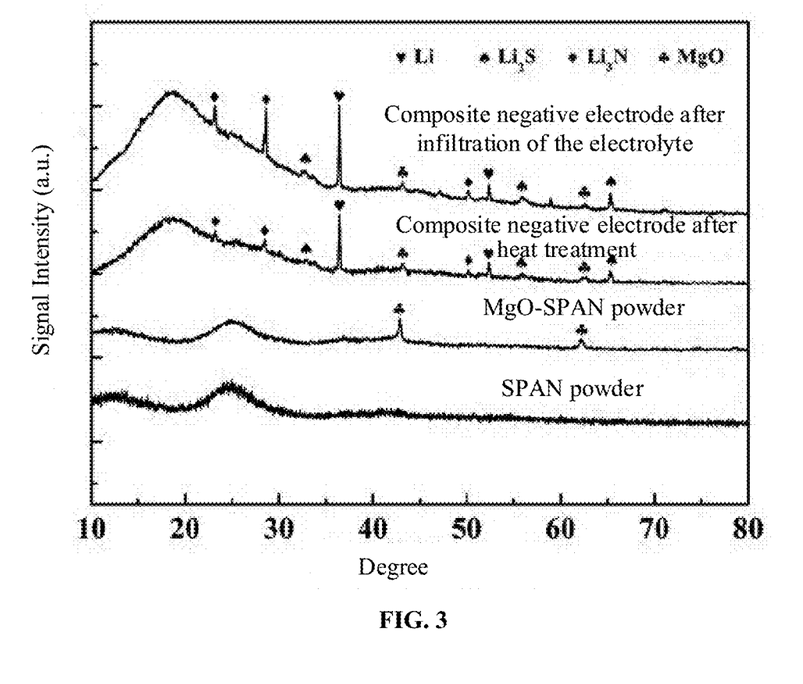
FIG. 3 is XRD patterns of the three-dimensional composite metallic lithium negative electrode, Li/MgO-SPAN powder, MgO-SPAN powder, and SPAN powder according to the Example 1 of the present application.

FIG. 3 shows XRD patterns of the three-dimensional composite metallic lithium negative electrode, Li/MgO-SPAN powder, MgO-SPAN powder and SPAN powder prepared according to Example 1 of the present application. It can be seen that after heat treatment or electrolyte reprocessing (for example, infiltration), the three-dimensional composite metallic lithium negative electrode of the present application has obvious lithium-philic fragment (MgO) and high-conductivity lithium ion components ($Li_3N$ and $Li_2S$). It shows that the three-dimensional composite metallic lithium negative electrode of the present application generates abundant $Li_2S$ and $Li_3N$ after sintering and heat treatment. After infiltrated in the electrolyte, the SPAN is deeply reduced due to the internal short circuit between the metal Li particles and SPAN, which further promotes the generation of $Li_2S$ and $Li_3N$. Due to the protective effect of $Li_2S$ and $Li_3N$ on Li in the three-dimensional framework structure, side reactions of between Li and electrolyte are reduced, and the cycle life is greatly prolonged compared with ordinary lithium tablets.

Figure 4:
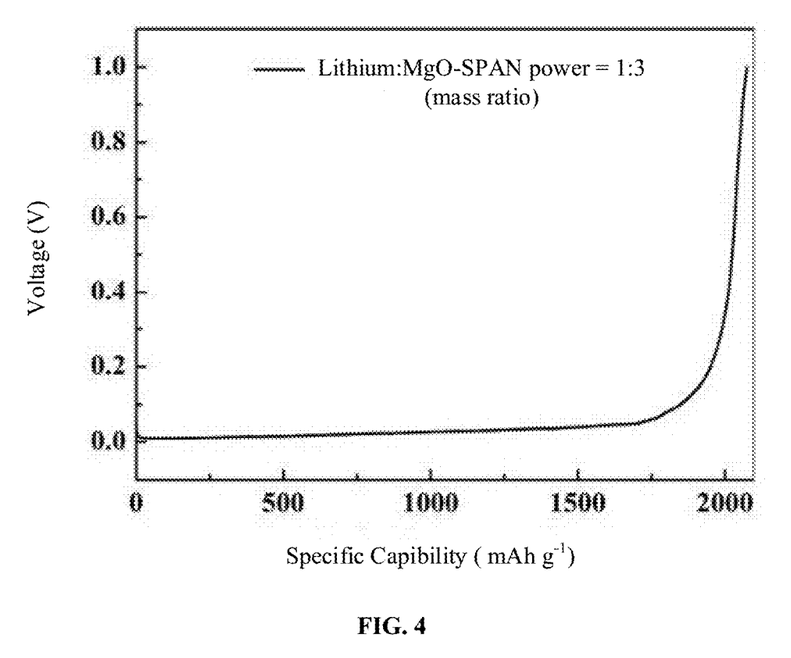
FIG. 4 is a mass specific capacity test diagram of the three-dimensional composite metallic lithium negative electrode according to the Example 1 of the present application.

FIG. 4 shows the specific capacity of the three-dimensional composite metallic lithium negative electrode tested by the lithium-containing negative electrode/metallic lithium sheet half-cell prepared according to Example 1 of the present application. It can be seen that the specific capacity of the three-dimensional composite metallic lithium negative electrode in Example 1 can reach 2093 mAh/g, indicating that the three-dimensional composite metallic lithium negative electrode prepared according to the present application meets the practical requirements of the system as a lithium battery negative electrode.

Figure 5:
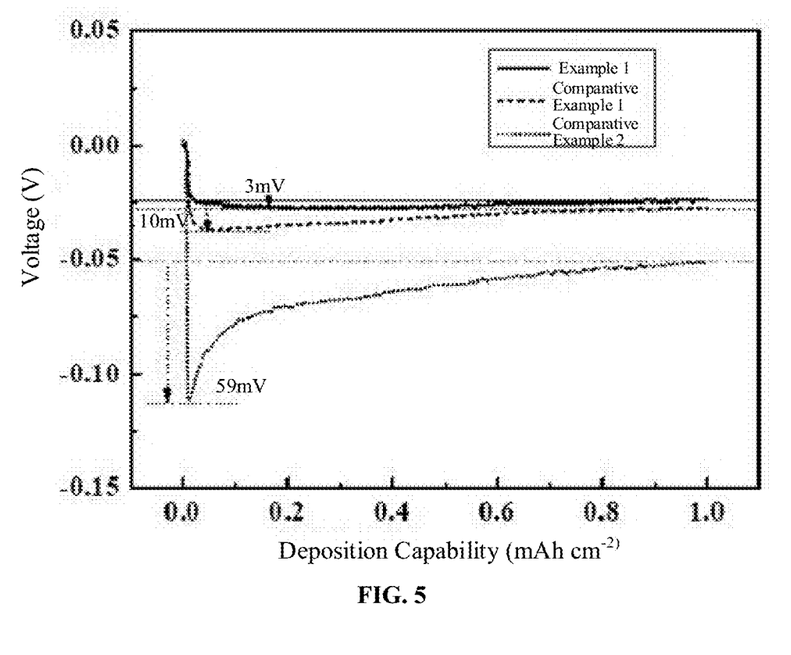
FIG. 5 is a graph of the nucleation overpotential change during the lithium deposition process tested by the three-dimensional composite metallic lithium negative electrode/metallic lithium sheet half-cell according to the Example 1 of the present application.

FIG. 5 shows a graph of the nucleation overpotential change during the lithium deposition process tested by the lithium-containing negative electrode/metallic lithium sheet half-cell prepared according to Example 1, Comparative Examples 1 and 2 of the present application. It can be seen that in the lithium-philic MgO system of Example 1, the lithium deposition overpotential and lithium nucleation overpotential of the half-cell are the smallest.

Figure 6:
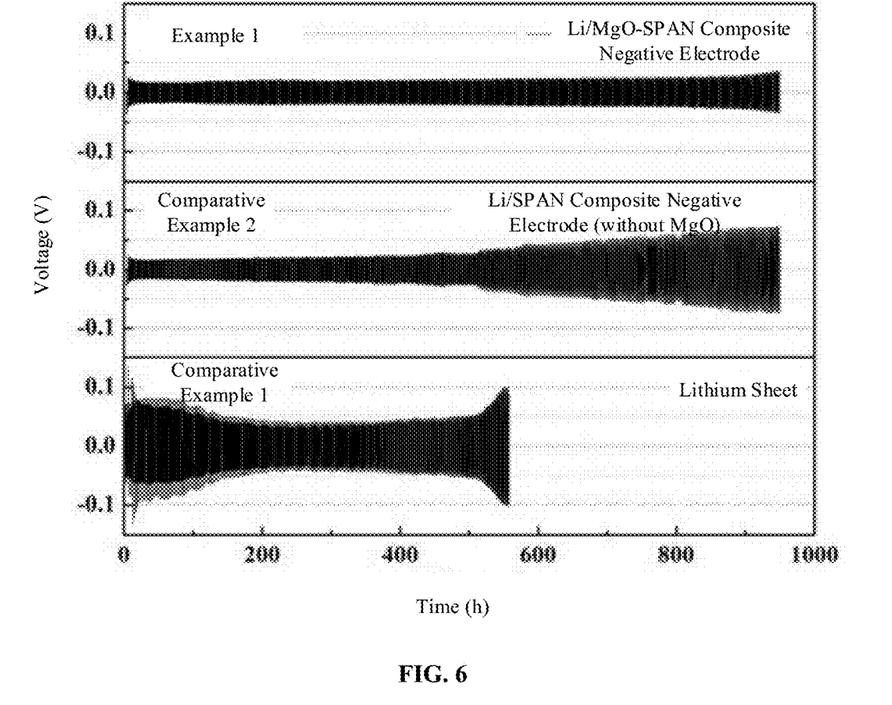
FIG. 6 shows a cycle performance of the three-dimensional composite metallic lithium negative electrode/three-dimensional composite metallic lithium negative electrode symmetric battery according to the Example 1 of the present application under the conditions of a current density of 1 mA/cm$^2$ and a deposition surface capacity of 1 mAh/cm$^2$.

FIG. 6 shows the cycle performance diagram of the lithium-containing negative electrode/lithium-containing negative electrode symmetric battery prepared according to Example 1. Comparative Examples 1 and 2 of the present application under the conditions of 1 mA/cm² current density and 1 mAh/cm² deposition surface capacity. It can be seen that after 900 hours, the polarization voltage of the lithium-containing negative electrode/lithium-containing negative electrode symmetric battery of the present application stabilizes at about 30 mV.

Figure 7:
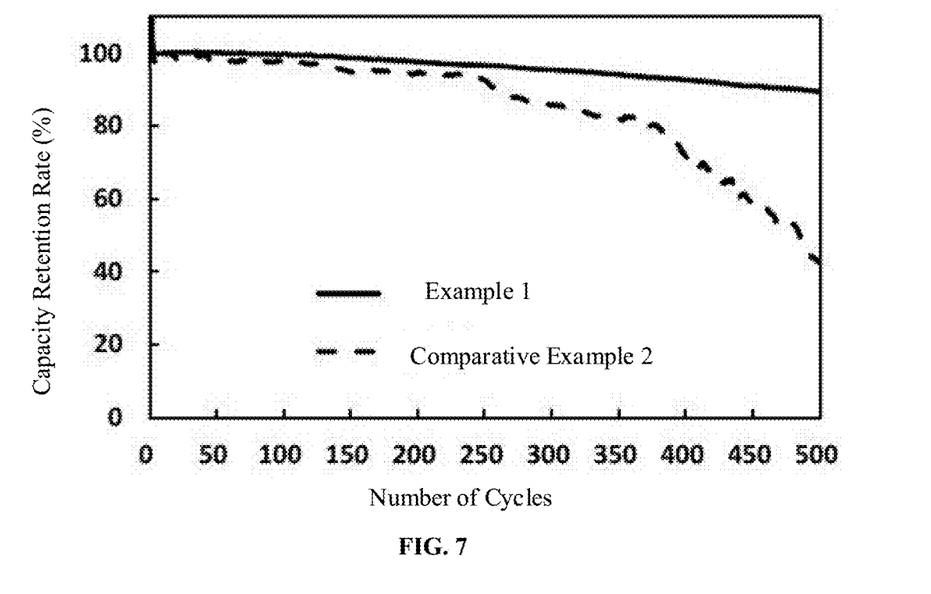
FIG. 7 is a comparison diagram of full battery cycling curves according to the Example 1 of the present application.

FIG. 7 shows a constant current charge and discharge cycle curve of a full battery prepared according to Example 1 and Comparative Example 2 of the present application at a rate of 1 C. It can be seen that after 488 cycles, the full battery capacity retention rate of the present application is 90%, and there is no dramatic decline.

The full batteries in the foregoing Examples 1-19 and the full batteries in Comparative Examples 1-3 are respectively subjected to a constant current charge and discharge test at a rate of 1 C, and when the gram capacity and capacity retention rate in the first cycle are reduced to 90%, the number of cycles and the dendrites on the surface of the lithium negative electrode after 200 cycles are recorded. The test results are listed in Table 2.

TABLE 2

| No. | C1* | C2* | E1* | C3* | Lithium dendrite |
|---|---|---|---|---|---|
| Example 1 | 2093 | 1284 | 98.7 | 488 | No |
| Example 2 | 1772 | 912 | 87.2 | 204 | Slight |
| Example 3 | 2136 | 1301 | 98.7 | 435 | No |
| Example 4 | 2112 | 1218 | 93.5 | 210 | No |
| Example 5 | 2108 | 1265 | 97.2 | 329 | No |
| Example 6 | 2053 | 1276 | 98.2 | 468 | No |
| Example 7 | 2012 | 1109 | 93.7 | 420 | No |
| Example 8 | 2087 | 1155 | 97.3 | 432 | No |
| Example 9 | 2133 | 1294 | 98.8 | 501 | No |
| Example 10 | 2124 | 1277 | 98.7 | 491 | No |
| Example 11 | 1872 | 982 | 89.2 | 189 | Slight |
| Example 12 | 1678 | 881 | 90.2 | 194 | Slight |
| Example 13 | 2125 | 1294 | 98.7 | 503 | No |
| Example 14 | 2114 | 1220 | 96.7 | 435 | No |
| Example 15 | 1321 | 752 | 84.2 | 356 | No |
| Example 16 | 1746 | 1006 | 86.5 | 387 | No |
| Example 17 | 2569 | 1245 | 91.3 | 217 | No |
| Example 18 | 2215 | 1308 | 98.8 | 345 | Slight |
| Example 19 | 1873 | 1020 | 89.7 | 234 | Slight |
| Comparative Example 1 | / | 947 | 76.3 | 64 | Serious |
| Comparative Example 2 | 2003 | 947 | 76.3 | 104 | Serious |
| Comparative Example 3 | 1634 | 1009 | 81.2 | 118 | Serious |
| Comparative Example 4 | 1988 | 1015 | 91.1 | 312 | No |

Notes:
C1*: Composite negative specific capacity (mAh/g);
C2*: Specific capacity of full battery in the first cycle (mAh/g);
E1*: Full battery efficiency in the first cycle (%),
C3*: The number of cycles at 90% capacity retention.

It can be seen from Table 2 and FIG. 7 that compared to the lithium battery assembled with the untreated lithium sheet (Comparative Example 1), the life of the lithium battery is greatly prolonged after the three-dimensional composite metallic lithium negative electrode of the present application is used in Example 1. This is mainly because: 1) it can be seen from the cross-sectional SEM image of the plate f after being completely delithiated in FIG. 1 that after the metallic Li particles are completely removed, a three-dimensional porous framework with a pore size of about 50 μm is left; the prepared three-dimensional composite metallic lithium negative electrode can effectively disperse current density, which is conducive to improving the lithium deposition, reducing the generation of highly active dendritic lithium, and improving the cycle stability; 2) the three-dimensional network structure of the three-dimensional composite metallic lithium negative electrode structure may be used as an accommodating body for lithium deposition, which effectively suppresses a huge volume change during an original lithium deposition/dissolution process, thereby can effectively suppress a frequent rupture and reorganization of SEI, and reduce the risk of electrolyte consumption caused by frequent reorganization of SEI; 3) caused by $Li_2S$ and $Li_3N$ which are rich in high ionic conductivity.

It can be seen from Comparative Example 1 and Comparative Example 2 with reference to FIG. 6 that, compared with the symmetric battery prepared based on the negative electrode without the lithium-philic fragment MgO, after the three-dimensional composite metallic lithium negative electrode is used in Example 1, the life of the symmetric battery is greatly extended and the lithium dendrites are significantly suppressed. This is mainly because the three-dimensional structure of the prepared composite negative electrode contains the lithium-philic fragment MgO, as shown in FIG. 5, which helps to reduce the overpotential of lithium nucleation during the lithium deposition process, improve the uniformity of deposition of lithium, and inhibit the battery polarization during the cycle and the formation of lithium dendrites.

It can be seen from the Comparing Examples 1~3 that, the sintering temperature has a great impact on the cycle life of the negative electrode. When the sintering temperature is high, the combination of lithium and the MgO-SPAN framework is tight and the internal components are more uniformly dispersed, so the cycle life is longer. However, excessive temperature may easily lead to the loss of active lithium.

It can be seen from the Comparing Examples 1, 4-7 and Comparative Example 2 that, the content of MgO has a certain effect on the cycle life. A suitable MgO content may make a lithium battery with better performance.

It can be seen from the Comparing Examples 1, 8-10 and Comparative Example 4 that, the lithium-philic material also has an effect on the battery cycle, and the metal oxides such as MgO, ZnO, $Bi_2O_3$ with better lithium-philic are more conducive to supporting the long-cycle stability of the battery, and systems such as $SiO_2$ have weaker lithium-philic ability which leads to poor battery cycle.

It can be seen from the Comparing Examples 1 and 10-12 that, the difference in polymers leads to differences in the performance of the active sites of the three-dimensional framework. The content and stability of active sites in the SPAN polymer framework are relatively high, which is conducive to improving the reversibility of battery cycles.

It can be seen from the Comparing Examples 1 and 13-14 that, the smaller the MgO-SPAN particles are, the more uniform the mixing with the lithium powder, the more complete the coating of lithium powder and the longer the cycle life. However, too small particle size will lead to high manufacturing costs. If the particle size is too large, the contact and the coating degree of the MgO-SPAN particles with lithium powder are decreased.

It can be seen from FIG. 4 that when the mass ratio of MgO-SPAN powder to metallic Li particles is 1:3, the mass specific capacity of the three-dimensional composite metallic lithium negative electrode of the present application is about 2093 mAh/g, which can meet the requirement of mass specific capacity of the negative electrode material at present. It can be seen from the Comparing Examples 1 and 15-17 that, if the content of MgO-SPAN is too low, its coating degree for lithium powder is easy to be low, which affects the cycle stability; while if the content of MgO-SPAN is too high, the amount of active lithium is reduced, which is not conducive to the long-term cycle of the battery.

It can be seen from the Comparing Example 1 and Comparative Example 3 that, after the heat treatment process, the lithium and the PAN framework are more closely combined and internally dispersed more uniformly, which is conducive to the improvement of the reversibility of lithium insertion and extraction during the subsequent battery charging and discharging process.

In summary, after adopting the three-dimensional composite metallic lithium negative electrode of the present application, the cycle performance of the lithium battery is significantly improved.

Based on the disclosure and teaching of the foregoing specification, those skilled in the art may also make changes and modifications to the foregoing examples. Therefore, the present application is not limited to the specific examples disclosed and described above, some modifications and changes to the present application should also fall within the protection scope of the claims of the present application. In addition, although some specific terms are used in this specification, these terms are only for convenience of description and do not constitute any limitation to the present application.

What is claimed is:

1. A three-dimensional composite metallic lithium negative electrode, comprising:
   metallic lithium particles, and
   a three-dimensional polymer framework;
   wherein the metallic lithium particles are filled in the three-dimensional polymer framework, and the three-dimensional polymer framework comprises lithium-philic fragments, active sites, and polymer-containing moieties, the lithium-philic fragments, the active sites, and the metallic lithium particles are uniformly distributed in the three-dimensional composite metallic lithium negative electrode, a difference in element distribution concentration of the lithium-philic fragments, the active sites, and the metallic lithium particles per square millimeter in a thickness direction of the three-dimensional composite metallic lithium negative electrode is not more than 5%; and
   wherein each of the lithium-philic fragments is a fragment of a metal oxide with lithium-philic characteristic, the metal oxide is in a form of particles, and the lithium-philic characteristic refers to be able to reduce a nucleation overpotential of a lithium deposition process, so that the nucleation overpotential of lithium ions in the three-dimensional composite metallic lithium negative electrode is less than 10 mV,
   wherein each of the active sites is an active group capable of undergoing a lithiation reaction contained in the three-dimensional polymer framework, and the active group comprises a sulfur-containing group,
   wherein the polymer-containing moieties comprise vulcanized and calcinated polyacrylonitrile (SPAN).

2. The three-dimensional composite metallic lithium negative electrode according to claim 1, wherein the metal oxide is selected from at least one of magnesium oxide, zinc oxide, copper oxide, lead oxide, bismuth oxide, tin oxide, and silver oxide.

3. The three-dimensional composite metallic lithium negative electrode according to claim 1, wherein the active group further comprises a nitrogen-containing group; and,
   wherein the polymer-containing moieties further comprise one selected from one of calcinated polyacrylonitrile (PAN), calcinated polyaniline (PANI), vulcanized and calcinated polyaniline (SPANI), calcinated polypyrrole (PPY), and vulcanized and calcinated polypyrrole (SPPY).

4. The three-dimensional composite metallic lithium negative electrode according to claim 1, wherein a molar ratio of the lithium-philic fragments to the active sites in the three-dimensional polymer framework is 1:5 to 1:60.

5. The three-dimensional composite metallic lithium negative electrode according to claim 1, wherein a volume average particle diameter of the particles of the metal oxide is 50 nm to 500 nm.

6. The three-dimensional composite metallic lithium negative electrode according to claim 1, wherein a volume average particle diameter of the metallic lithium particles is 1 μm to 100 μm.

7. The three-dimensional composite metallic lithium negative electrode according to claim 1, wherein a molar ratio of the lithium-philic fragments to metallic lithium particles is 1:58 to 1:1000.

8. The three-dimensional composite metallic lithium negative electrode according to claim 1, wherein the three-dimensional composite metallic lithium negative electrode further comprises a conductive material selected from one or more of carbon nanotubes, conductive carbon black, and graphene.

9. The three-dimensional composite metallic lithium negative electrode according to claim 8, wherein an inner diameter of the carbon nanotube is 1 nm~10 nm, and a length of the carbon nanotube is about 5 μm to 20 μm.

10. The three-dimensional composite metallic lithium negative electrode according to claim 8, wherein a content of the conductive material is 5 wt % to 30 wt %.

11. The three-dimensional composite metallic lithium negative electrode according to claim 1, wherein a weight ratio of the lithium-philic fragments relative to the three-dimensional composite metallic lithium negative electrode is 0.5% to 5%.

12. The three-dimensional composite metallic lithium negative electrode according to claim 1, wherein a mass ratio of the lithium-philic fragments to the metallic lithium particles is 1:10 to 1:150.

13. The three-dimensional composite metallic lithium negative electrode according to claim 1, wherein a mass ratio of the three-dimensional polymer framework to the metallic lithium particles is 1:10.

14. The three-dimensional composite metallic lithium negative electrode according to claim 1, wherein a pore diameter in the three-dimensional composite metallic lithium negative electrode is 10 μm to 800 μm.

15. The three-dimensional composite metallic lithium negative electrode according to claim 1, wherein the sulfur-containing group is selected from at least one of —S—, —S—S—, —S—S—S—, and —S—(S)n—S—, wherein n is an integer.

16. A metallic lithium battery, comprising a positive electrode, a three-dimensional composite metallic lithium negative electrode, a separator, and an electrolyte, wherein the three-dimensional composite metallic lithium negative electrode comprises:
   metallic lithium particles, and
   a three-dimensional polymer framework;
   wherein the metallic lithium particles are filled in the three-dimensional polymer framework, and the three-dimensional polymer framework comprises lithium-philic fragments, active sites, and polymer-containing moieties, the lithium-philic fragments, the active sites, and the metallic lithium particles are uniformly distributed in the three-dimensional composite metallic lithium negative electrode, a difference in element distribution concentration of the lithium-philic fragments, the active sites, and the metallic lithium particles per square millimeter in a thickness direction of the three-dimensional composite metallic lithium negative electrode is not more than 5%;
   wherein each of the lithium-philic fragments is a fragment of a metal oxide with lithium-philic characteristic, the metal oxide is in a form of particles, and the lithium-philic characteristic refers to be able to reduce a nucleation overpotential of a lithium deposition process, so that the nucleation overpotential of lithium ions in the three-dimensional composite metallic lithium negative electrode is less than 10 mV;
   wherein the active sites and the metallic lithium particles are uniformly distributed in the three-dimensional composite metallic lithium negative electrode,
   wherein each of the active sites is an active group capable of undergoing a lithiation reaction contained in the three-dimensional polymer framework, and the active group comprises a sulfur-containing group,
   wherein the polymer-containing moieties comprise vulcanized and calcinated polyacrylonitrile (SPAN).

17. An apparatus, comprising the metallic lithium battery of claim 16.

* * * * *